(12) United States Patent
Sudhakar (10) Patent No.: US 7,908,490 B2
(45) Date of Patent: Mar. 15, 2011

(54) TECHNIQUES FOR SYNCHRONIZING AND ARCHIVE-VERSIONING OF ENCRYPTED FILES

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 815 days.

(21) Appl. No.: 11/973,115

(22) Filed: Oct. 5, 2007

(65) Prior Publication Data

US 2009/0006869 A1    Jan. 1, 2009

(30) Foreign Application Priority Data

Jun. 28, 2007   (IN) .............. 1383/DEL/2007

(51) Int. Cl.
*G06F 12/14* (2006.01)
(52) U.S. Cl. .......... 713/193; 711/163; 711/164; 380/259
(58) Field of Classification Search .............. 713/193; 711/163, 164; 380/259
See application file for complete search history.

(56) References Cited

U.S. PATENT DOCUMENTS

| | | | |
|---|---|---|---|
| 5,805,705 A | 9/1998 | Gray et al. | |
| 5,940,507 A | 8/1999 | Cane et al. | |
| 6,233,589 B1 | 5/2001 | Balcha et al. | |
| 6,754,827 B1 | 6/2004 | Cane et al. | |
| 6,891,952 B1 | 5/2005 | Puehlhoefer et al. | |
| 2004/0158703 A1 | 8/2004 | Lund | |
| 2005/0058287 A1 | 3/2005 | Ferren et al. | |
| 2005/0177603 A1* | 8/2005 | Shavit | 707/204 |
| 2007/0118819 A1* | 5/2007 | Basin et al. | 715/847 |
| 2009/0138948 A1* | 5/2009 | Calamera et al. | 726/6 |

* cited by examiner

*Primary Examiner* — Benjamin E Lanier
*Assistant Examiner* — Malcolm Cribbs
(74) *Attorney, Agent, or Firm* — Schwegman, Lundberg & Woessner, P.A.

(57) ABSTRACT

Techniques are presented for synchronizing and archive-versioning encrypted files. Blocks of encrypted data are managed and metadata is maintained for the blocks. The metadata identifies a maximum number of blocks and an index or parameter string. The string includes transaction identifiers and relative block numbers. The metadata is used as parameter information to a hash algorithm along with a hash key to acquire a unique initialization vector for each block. Each initialization vector when supplied to a cipher service along with a particular block of data produces an encrypted version of the data supplied or supplies a decrypted version of the data supplied. The techniques are also applied to files being archived and versioned from a storage volume.

11 Claims, 3 Drawing Sheets

TECHNIQUES FOR SYNCHRONIZING AND ARCHIVE-VERSIONING OF ENCRYPTED FILES

RELATED APPLICATIONS

The present application claims priority to India Patent Application No. 1383/DEL/2007 filed in the India Patent Office on Jun. 28, 2007 and entitled "TECHNIQUES FOR SYNCHRONIZING AND ARCHIVE-VERSIONING OF ENCRYPTED FILES;" the disclosure of which is incorporated by reference herein.

FIELD

The invention relates generally to data storage processing and more particularly to secure techniques for synchronizing and archive-versioning encrypted files.

BACKGROUND

Increasingly enterprises and individuals expect to have access to information twenty-four hours a day, seven days a week, and three-hundred sixty-five days a year. Additionally, since the world economy has become highly networked, the location of the information desired by users has become largely irrelevant.

Many techniques are deployed by enterprises to ensure that their data is available when requested, when failures occur, or when recovery of specific versions of their data is needed. One such technique employs data replication or mirroring; such that the data is available from multiple independent data sources should some type of failure occur. Another technique permits data to have multiple versions, such that the data along with its versions are archived and acquired from a separate storage area on demand.

Furthermore, the security of data has also become a significant concern for enterprises. Thus, replicated data, archived data, and versioned data are often encrypted. A variety of techniques exists for encrypting data in blocks on a storage volume and securely delivering decrypted versions of the blocks as needed.

Each of the available techniques for securely encrypting and decrypting blocks of data has their own advantages and disadvantages. However, they all appear to suffer from one major drawback and that is when a block is added or removed, then all the blocks from those that were inserted or deleted have to be resynchronized when remote resynchronization tools are used or when file difference generating algorithms are used, since all those blocks are changed. This is a costly operation in terms of memory and processing.

Therefore, improved techniques for synchronizing and archive-versioning encrypted files are desirable.

SUMMARY

In various embodiments, techniques are provided for synchronizing and archive-versioning encrypted files. More particularly and in an embodiment, a synchronized version of a file is managed as encrypted blocks of data that when assembled and when decrypted represent a copy of that file. Also, metadata is maintained for the encrypted blocks. The metadata includes a maximum number for the encrypted blocks and an index string, which identifies added and removed ones of the encrypted blocks. The maximum number and selective portions of the index string are used as input to a hash algorithm along with a hash key in order to produce a unique initialization vector for each of the encrypted blocks. The initialization vectors are then used to properly encrypt and decrypt data associated with each of the encrypted blocks.

DETAILED DESCRIPTION

As used herein, a "file" refers to a logical grouping of information organized in a particular fashion and accessed and consumed by a resource (e.g., user or automated service, etc.) as a single document or unit of information. The underlying services that manage the file on a storage volume or machine may or may not store the data associated with the file in a contiguous fashion. But from the perspective of the resource, the file looks and behaves as if the data is contiguous.

In fact, at lower levels of implementation, a file is often broken into equal sized chunks called "blocks." The maximum number of blocks for any given file can be provided as a configuration to storage management services or can be calculated by dividing the system limit or policy-based limit for the size of any given file by a desired block size (maximum_file_size divided by block_size=max_number_of_blocks).

An "initialization vector" (IV) is a block of bits that when provided to a cipher service along with a block of data and encryption key for a file produces an encrypted or decrypted version of that block of data. Yet, having the IV is not particular useful in discovering the encryption/decryption being used by the cipher service.

The point of the IV and the cipher service is to prevent unauthorized access to blocks of a file or to versions of files. With other storage encryption techniques, should an intruder discover how a particular block is encoded, then the intruder could potentially discover how some other similar blocks are encoded and thus compromise the entire storage environment and its encrypted data and files. The IV and cipher service combination provides a random and yet securely repeatable mechanism for one block to be dependent and yet also independent from the other blocks of a file. So, an intruder might discover the encoding of one block but this will not assist in the discovery of the other blocks.

A variety of existing IV and cipher services exist in the industry; however these techniques force blocks to be renumbered when blocks are added or deleted from a set of blocks representing a particular file. Consequently, the existing approaches are not useful in maintaining versions of encrypted files. The enumerated limitations and others are corrected with the teachings presented herein and below.

In what follows, it will be demonstrated how different types of securely repeatable initialization vectors may be constructed and special information retained that permits blocks to be more efficiently encrypted and decrypted from storage and permits versions of files to be more efficiently archived and versioned. This also permits remote synchronization services to send only a same number of changed blocks in an encrypted file as that which is in the corresponding unencrypted file.

According to an embodiment, the techniques presented herein may be implemented within Novell storage products distributed by Novell, Inc. of Provo, Utah and/or Linux operating system (OS) environments. Of course it is to be understood that any network architecture, OS, device, proxy, or product may be enhanced to utilize and deploy the techniques presented herein and below.

Figure 1:
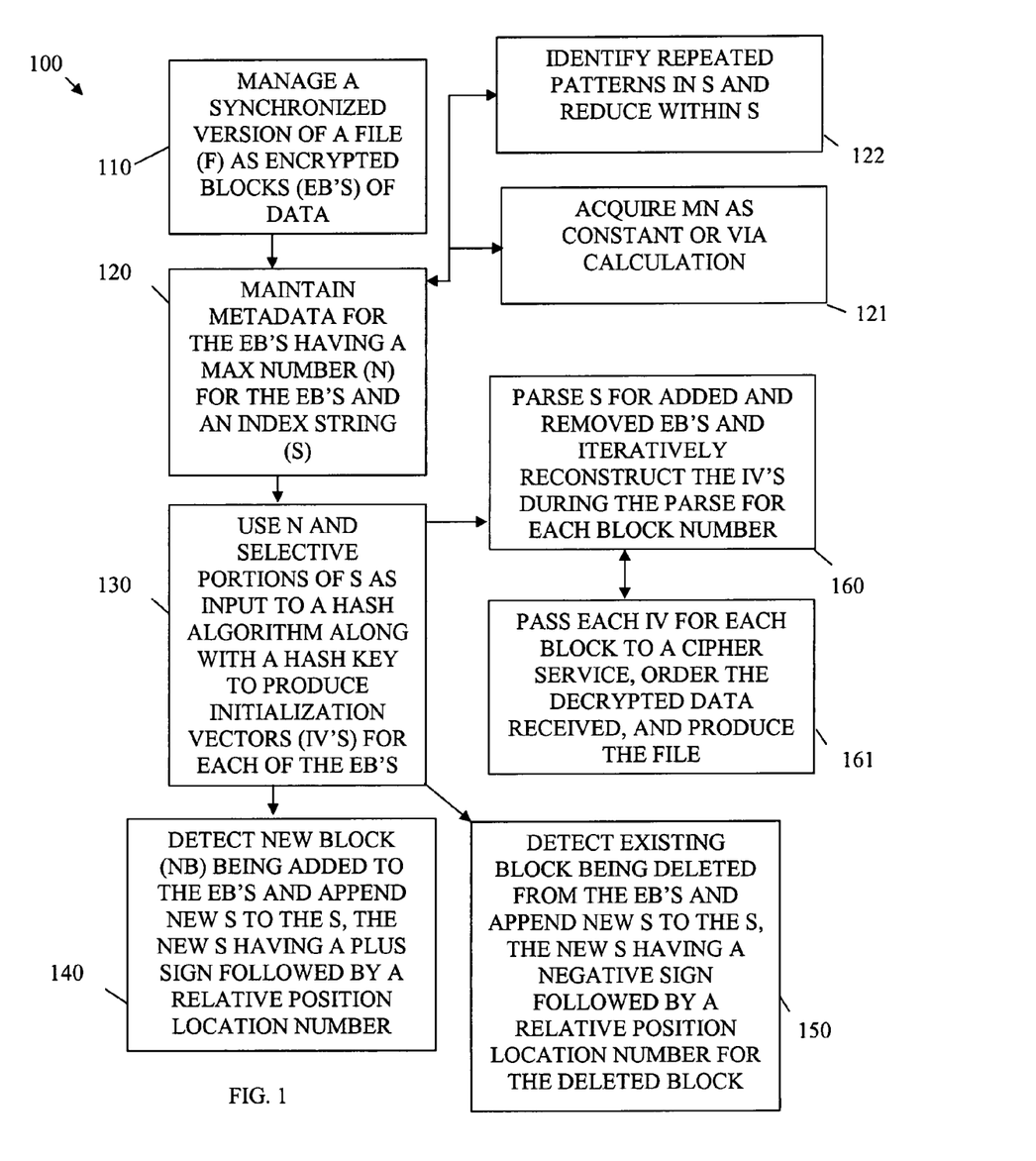
FIG. 1 is a diagram of a method for synchronizing encrypted blocks of a file, according to an example embodiment.

FIG. 1 is a diagram of a method 100 for synchronizing encrypted blocks of a file, according to an example embodiment. The method 100 (hereinafter "secure synchronization service") is implemented in a machine-access and machine-readable medium and is accessible over a network. The network may be wired, wireless, or a combination of wired and wireless.

The secure synchronization service may be implemented as an enhancement to a service that executes within an operating system or that executes within a standalone storage encryption/decryption replication and synchronization product.

Initially, the secure synchronization service is configured to monitor an environment or storage volume (can be sets of volumes) for purposes of replication or synchronization with another volume or a reserved partition of the same volume being monitored. The files of the volume being monitored are synchronized to the other volume or as stated above to the reserved partition of the same volume being monitored, in the manner discussed below.

The data of the files is encrypted for security purposes and uses an enhanced Encrypted Salt-Sector Initialization Vector (ESSIV) technique achieved by creating novel types of Initialization Vectors (IV's).

It is noted that for purposes of illustration and ease of comprehension the processing of the secure synchronization service is discussed with respect to processing a single file on a volume or storage environment; however, the secure synchronization service can monitor all files or configurable subsets of files on the volume or within the storage environment; each file processed in the following manners.

At 110, the secure synchronization service manages a synchronized version of a file as encrypted blocks of data. While managing the synchronized version of the file, at 120, the secure synchronization service maintains metadata for the encrypted blocks of data as a whole. This metadata includes a maximum number of blocks for the file and a string (special information discussed more completely below).

According to an embodiment, at 121, the secure synchronization service determines the maximum number of encrypted blocks by acquiring a constant associated with all files or a particular class of files to which the file being managed belongs. The constant is preconfigured for the storage environment or operating system being used.

In some cases, at 121, the secure synchronization service can also dynamically calculate the maximum number of blocks by dividing the maximum permissible file size (in bytes) by the preferred or desired block size (in bytes). So, the maximum number of encrypted blocks for the file being managed can be based on all files, subsets of files, or even a particular file based on policy and identity of that file. Additionally, the maximum number of encrypted blocks can be a fixed constant acquired by the secure synchronization service or can be something that the secure synchronization service dynamically calculates when needed.

The metadata also includes an index string. The index string includes a serial listing of relative block information and transactional identifiers or details. That is, the index string identifies added and removed encrypted blocks from the file being synchronized and kept in encrypted format on the storage volume.

For example, suppose initially that a new block was being added between blocks 3 and 4; in such a case the substring, within the index string, identifies this situation as "+3." The plus sign symbol "+" identifies a transaction taking place within the file; specifically a new block being added. If a block is removed, the transaction identifier is a negative sign symbol "-." A complete example of index string and its contents within the context of an example illustration is presented below.

In an embodiment, at 122, the secure synchronization service recognizes repeating patterns within the index string associated with the metadata. These repeating patterns are reduced by the secure synchronization service. For example, consider an index string that appears as "-4-4-4-4-4-4." This depicts data being deleted from the file being synchronized by deleting a current $4^{th}$ block for 6 successive iterations. The secure synchronization service can represent this in a reduced format of "-(4-9)." This is so because each time a $4^{th}$ block is deleted from the encrypted set of blocks representing the file being synchronized the next or then $5^{th}$ block slides to a new $4^{th}$ block position. So, in the example, a series of 6 successive operations to delete the $4^{th}$ block is really a single operation that deletes a range of blocks, namely blocks 4-9. It is noted that this is but one illustration and other reduction techniques can be used to reduce repeating patterns detected in the index string.

At 130, the secure synchronization servile uses the maximum number of encrypted blocks and selective portions of the index string as input to a hash algorithm along with a securely acquired hash key. This produces from the hash algorithm an IV for each encrypted block of the file. The IV can be subsequently supplied to a cipher service along with the block to which it relates to produce either an encrypted version of that block or a decrypted version of that block.

Typically, a storage encryption hash algorithm takes as input the hash key and expects a sector number (sector being the smallest addressable unit of storage in bytes that a particular storage environment supports). In the present teaching, the sector number is replaced by a block number and the block number is not in every case a real block number for a particular block of the data associated with the file; rather the block number supplied to the hash algorithm is a relative number that is calculated in the manners discussed more completely below with the example illustrations presented. Thus, the phrase "selective portion" refers to this relative block number that is calculated, which uses in some cases the maximum block number and other previous block transactions.

According to an embodiment, at 140, the secure synchronization service detects a new block being added to the encrypted blocks. In response to this, the secure synchronization service appends a new string to the index string. The new string includes a plus sign (transaction identifier) followed by a relative position location number. The relative position location number is the block number of the first encrypted block that the new block is being inserted between. So, if the new block were being inserted between blocks 7 and 8, the secure synchronization service adds "+7" onto the end of the index string to capture this transaction in the file being actively synchronized.

In another case, at 150, the secure synchronization service detects a transaction on the file that indicates an existing block is being deleted from the encrypted blocks of the file. In response to this, the secure synchronization service appends a new string having a negative sign (transaction identifier) followed by a position location number that identifies the existing block being deleted within the encrypted blocks. For example, if block 8 were deleted, the secure synchronization service writes a new substring of "−8" onto the end of the index string.

In an embodiment, at 160, the secure synchronization service parses the index string for added and removed encrypted blocks. This can be done using the transaction identifier (sets of reserved characters identifying addition and subtraction operations on the file) as a delimiter when parsing the index string. Each transaction is then iteratively processed by the secure synchronization service to reconstruct the IV's for each block number of the file. At 161, each IV and data associated with the block to which that IV relates is passed to a cipher service to acquire a decrypted version of that block of data. Next, the blocks are properly ordered and the file is produced for subsequent consumption by a user or an automated service.

Example Illustration Number One

The maximum number of blocks is taken dynamically at any time during its life cycle as max file size divided by block size. Assume this to be 4 gigabytes (GB) and maximum number of blocks is referenced as "S" for this example. A total number of blocks that are appended is also maintained. This total number of appended blocks is referred to as "N" for this example.

Initially, S=256 and N=50 and transactions against a file that the blocks represents takes place. A first transaction inserts a new block after the $31^{st}$ block position for the file. The index string is now represented by the secure synchronization service as "+31." Next, block 18 is deleted and the index string becomes "+31−18." If another block is again inserted after the $43^{rd}$ position then the index string becomes "+31−18+43." Again, if the $27^{th}$ block is inserted then the index string becomes "+31−18+43+27."

The block number replaces the sector number for an ESSIV hash algorithm that produces an IV for consumption by a cipher service. So, IV=E(SALT, block number), where SALT=Hash(KEY). Replacing the traditional sector number with a block number results in a derivation of the IV, called IV1 herein.

When the secure synchronization service appends information, the value of N is incremented and it is used as a block number for calculating the ESSIV. So, IV=E(SALT, N), where SALT=Hash(KEY). This is another derivation of the IV, called IV2 because the traditional sector number is replaced in the hash parameters with N, the total number of blocks appended.

Suppose further that when the $27^{th}$ block is inserted (in the above illustration), the value "S+18+43+27" becomes input to the ESSIV, where IV=E(SALT, (S+18+43+27)) and where SALT=Hash(KEY)). Note that "+31" was not added. This is so because depending upon the IV size returned from the hash algorithm, just the last 2 or 3 number of insertions or deletions can be used and appended to S. Recall further that S=256; thus the IV=E(SALT,(256+18+43+27)). Moreover, when there is only one inserting then just that one is taken not 2 or 3 preceding transactions since they do not exist and remaining bits of the IV are made zero because the IV can be any number and there is no restriction that it should not contain many zeros. This type of IV derivation is referred to as IV3.

Furthermore, N is not incremented if a new block is inserted between blocks and N is not decremented if an existing block is removed between blocks. N is just incremented and just decremented if an IV of a last block is of type IV1 or IV2.

During decryption, the secure synchronization service uses the index string and the maximum number of blocks to identify blocks that are inserted and for computing the proper IV's for them.

Example Illustrating Number Two

This illustration visually shows how the maximum number of encrypted blocks and index string is used to acquire the IVs in encryption and decryption.

| For the encryption case: | | | | | | | |
|---|---|---|---|---|---|---|---|
| 1. Initial state: S = 256, N = 7, Index String: "" | | | | | | | |
| IV | 1 | 2 | 3 | 4 | 5 | 6 | 7 |
| Block | 1 | 2 | 3 | 4 | 5 | 6 | 7 |
| 2. Insert block between 3 and 4: S = 256, N = 7, Index String: "+3" | | | | | | | |
| IV | 1 | 2 | 3 | 256+"+3" | 4 | 5 | 6 | 7 |
| Block | 1 | 2 | 3 | 3.5 | 4 | 5 | 6 | 7 |

Note: 3.5 is only indicative. No where is this information (3.5) stored.

| 3. Delete $6^{th}$ block: S = 256, N = 7, Index String: "+3−6" | | | | | | | |
|---|---|---|---|---|---|---|---|
| IV | 1 | 2 | 3 | 256+"+3" | 4 | 5 | 7 |
| Block | 1 | 2 | 3 | 3.5 | 4 | 5 | 7 |
| 4. Insert block between $2^{nd}$ and $3^{rd}$ block: S = 256, N = 7, Index String: "+3−6+2" | | | | | | | |
| IV | 1 | 2 | 256+"−6+2" | 256+"+3" | 3 | 4 | 5 | 7 |
| Block | 1 | 2 | 2.5 | 3.5 | 3 | 4 | 5 | 7 |
| 5. Delete $5^{th}$ block: S = 256, N = 7, Index String: "+3−6+2−5" | | | | | | | |
| IV | 1 | 2 | 256+"−6+2" | 256+"+3" | 4 | 5 | 7 |
| Block | 1 | 2 | 2.5 | 3.5 | 4 | 5 | 7 |
| 6. Delete $6^{th}$ block: S = 256, N = 7, Index String: "+3−6+2−5−6" | | | | | | | |
| IV | 1 | 2 | 256+"−6+2" | 256+"+3" | 4 | 7 |
| Block | 1 | 2 | 2.5 | 3.5 | 4 | 7 |
| This can be rewritten as: | | | | | | | |
| IV | 1 | 2 | 256+"−6+2" | 256+"+3" | 4 | 7 |
| Block | 1 | 2 | 3 | 4 | 5 | 6 |

| IVs in decryption: |
|---|
| 1. Initial state: S = 256, N = 7, Index String: "+3−6+2−5−6" IVs are unknown. IV |
| Block  1  2  3  4  5  6 |

-continued

The index string can be used to arrive at the IVs.
2. Operation "−6":
S = 256, N = 7, Index String: "+3−6+2−5"
IV

| Block | 1 | 2 | 3 | 4 | 5 | X | 6 |
|-------|---|---|---|---|---|---|---|

3. Operation "−5":
S = 256, N = 7, Index String: "+3−6+2"
IV

| Block | 1 | 2 | 3 | 4 | X | 5 | X | 6 |
|-------|---|---|---|---|---|---|---|---|

4. Operation "+2":
S = 256, N = 7, Index String: "+3−6"
IV               256+"−6+2"

| Block | 1 | 2 | 3 | 4 | X | 5 | X | 6 |
|-------|---|---|---|---|---|---|---|---|

5. Operation "−6":
S = 256, N = 7, Index String: "+3"
IV               256+"−6+2"

| Block | 1 | 2 | 3 | 4 | X | 5 | X | X | 6 |
|-------|---|---|---|---|---|---|---|---|---|

6. Operation "+3":
S = 256, N = 7, Index String: ""
IV               256+"−6+2"   256+"+3"

| Block | 1 | 2 | 3 | 4 | X | 5 | X | X | 6 |
|-------|---|---|---|---|---|---|---|---|---|

7. Fill up remaining blocks:
S = 256, N = 7, Index String: ""
IV    1  2  256+"−6+2"  256+"+3"  3  4  5  6  7

| Block | 1 | 2 | 3 | 4 | X | 5 | X | X | 6 |
|-------|---|---|---|---|---|---|---|---|---|

Rewrite it by removing deleted blocks (noted as X) as:
IV    1  2  256+"−6+2"  256+"+3"  4  7

| Block | 1 | 2 | 3 | 4 | 5 | 6 |
|-------|---|---|---|---|---|---|

This is the same IV as the one at the end of encryption. So IVs are retrieved successfully and hence decryption can be done.

It is noted that N need not be stored. The total number of blocks in the encrypted files and the number of deleted blocks (represented by "−" in the index string) will give this value. S can be fixed or hard coded in the application which can be same for all files. Instead of "−4−4−4−4−4−4" in the index string the service can reduce it to a range, such as "−(4 to 9)."

The techniques presented so far have dealt with generating initialization vectors for encrypted files, which can be used in synchronization. The discussion of FIG. 2 focuses on archive-versioning.

Figure 2:
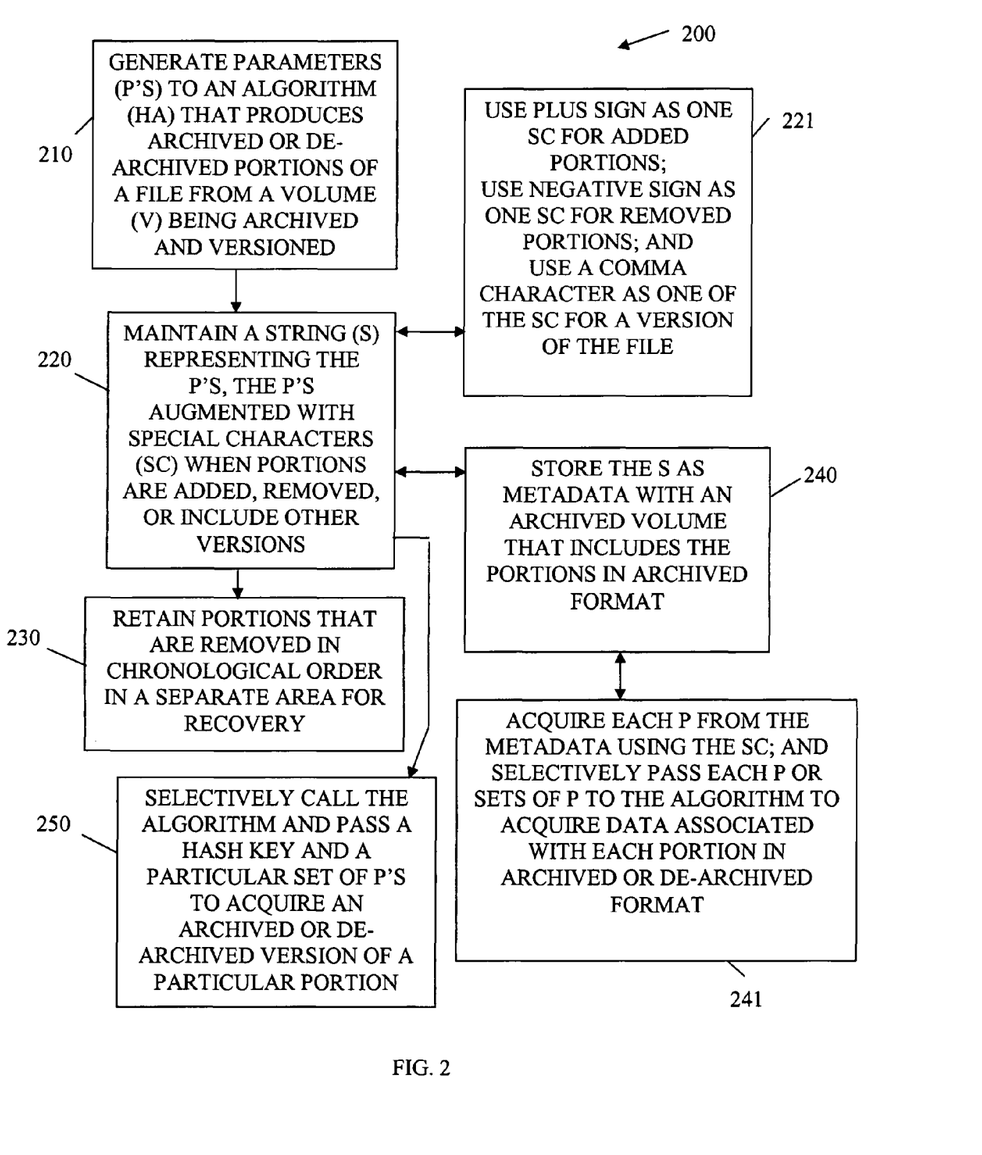
FIG. 2 is a diagram of a method for archiving and versioning a file of a volume under archive-versioning control, according to an example embodiment.

FIG. 2 is a diagram of a method 200 for managing files of a volume under archive-versioning control, according to an example embodiment. The method 200 (hereinafter "archive-versioning service") is implemented in a machine-accessible and readable medium and is accessible over a network. The network may be wired, wireless, or a combination of wired and wireless.

Initially, a volume having files or a subset of a volume having files is under version control and versions are archived to another volume or a reserved portion of the volume being monitored. The files are archived in a compressed or encrypted format.

At 210, the archive-versioning service generates parameters to an algorithm that produces archived and de-archived portions of a file from a volume being archived and versioned. In an embodiment, the algorithm is an ESSIV algorithm that produces an initiation vector (IV); the IV consumed by a cipher service to uniquely generate portions of a file independent of other portions of the same file. However, the parameters supplied are relative portion numbers or references and not sector numbers as would traditionally be the case.

At 220, the archive-versioning service maintains a string representing the parameters augmented with special characters when portions of the file are added, removed, and when a particular potion includes other versions. So, the parameters include special characters known to and recognized by the archive-versioning service. These characters identify transactions, such as adding portions to the file, and such as deleting portions of the file. The characters also identify whether some portions have multiple versions.

According to an embodiment, at 221, the archive-versioning service uses a plus sign "+" as one of the special characters for identifying adding a portion to the file. A negative sign "−" identifies deleting or removing a portion from the file. Also, a comma "," identifies a particular portion, which forms a version of the file. As an example: in the string "+3−6+2−5+6"; if "+3−6" and "+2−5" forms 2 versions of the file then it is stored as "+3−6,+2−5,−6". With this information different versions of file can be readily identified and later reconstructed on demand.

In an embodiment, at 230, the archive-versioning service retains portions of the file that are actively removed in chronological order and in a separate area for recovery when requested. Thus, deleted versions can be recovered and reconstructed.

In one arrangement, at 240, the archive-versioning service stores the string as metadata within an archived volume that includes the portions of the file in archived format. At 241, the archive-versioning service acquires each parameter from the metadata using the special characters as delimiters when parsing the metadata. The archive-versioning service then selectively passes each parameter or sets of parameters to the algorithm to acquire data associated with each portion in an archived or de-archived format. The algorithm essentially produces an IV and the then forwards this to cipher service to produce data associated with a particular portion of the file in archived or de-archived format.

In another case, at 250, the archive-versioning service selectively calls the algorithm and passes a hash key and a particular set of parameters to acquire an archived or de-archived version of a particular portion of the file. This processing may be iterated so that an entire archived or de-archived version of the file is produced.

One now appreciates how IV's or different types can be created using relative blocks or portions of a file. These IV's when consumed by a cipher service result in encrypted/decrypted or archived/de-archived versions of portions of files. Each IV having different encryption/decryption that is unique to it via its IV and some IV's using relative block numbers in their production. The portions or blocks of the file when assembled produce the file.

It is also noted that the differences between versions of a particular file may be represented using deltas. An example of this is available in U.S. Pat. No. 6,233,589; commonly assigned to Novell, Inc. of Provo, Utah. So, the technique presented herein can incorporate delta approaches to versioning, such as the one referenced above.

Figure 3:
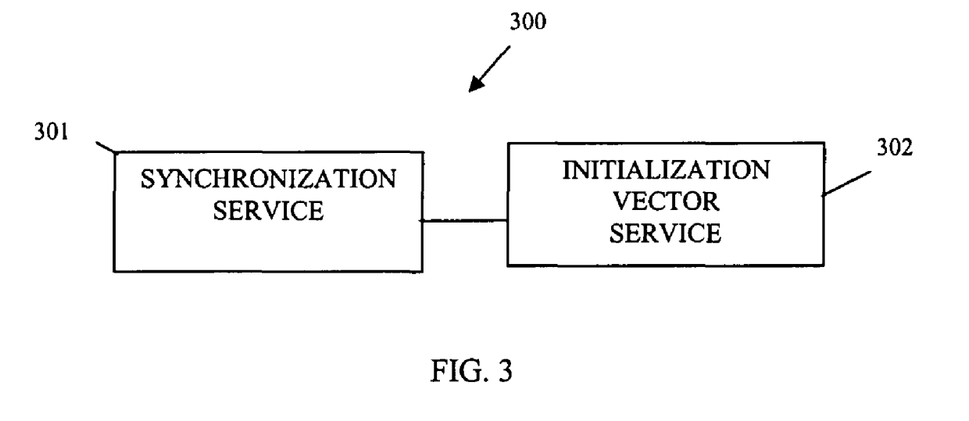
FIG. 3 is a diagram of a file synchronization system, according to an example embodiment.

FIG. 3 is a diagram of a file synchronization system 300, according to an example embodiment. The secure communication key generation and distribution system 300 is implemented in a machine-accessible and readable medium and is accessible over a network. The network may be wired, wireless, or a combination of wired and wireless. In an embodiment, the file synchronization system 300 implements, among other things, various aspects of the method 100 of the FIG. 1.

The file synchronization system 300 includes a synchronization service 301 and an initialization vector (IV) service 302. Each of these and their interactions with one another will now be discussed in turn.

The synchronization service 301 is implemented in a machine-accessible and readable medium and is to process on a machine. The synchronization service 301 is to maintain an encrypted version of a file in synchronization with a decrypted version of that file. This is done via encrypted blocks that when assembled in the proper order represented the decrypted version for the file.

The synchronization service 301 is also to maintain metadata for the encrypted blocks. The metadata includes a maximum number for the encrypted blocks and an index string (special information). The index string identifies added and removed ones of the encrypted blocks.

The IV service 302 is implemented in a machine-accessible and readable medium and is to process on the same machine or a different machine of the network.

The IV service 302 is to produce an IV for each encrypted block of the encrypted version of the file. This is done by passing the maximum number and selective portions of the index string as parameters to a hashing algorithm, which can be a part of the IV service 302; although it does not have to be in every case. Each IV permits a particular block of data associated with the file to be encrypted or decrypted when supplied to a cipher service.

In an embodiment, the IV service 302 is to serially append a substring onto the index string when a new block of data is detected as being inserted within the encrypted blocks. The substring includes a plus sign symbol "+" and a relative block position within the encrypted blocks to place the new block of data. The relative block position can be expressed in terms of an expression, such as "+7" In this example of "+7" the new block is added between blocks 7 and 8 and is represented by the expression of "+7."

In a similar situation, the IV service 302 is to serially append a substring onto the index string when an existing block of data is detected as being deleted from the encrypted blocks. The substring includes a negative sign symbol "−" and a number representing a block position within the encrypted blocks that identifies the existing block to remove. So, removing an $8^{th}$ block appears as a substring "−8."

In operation, the synchronization service 301 invokes the IV service 302 to produce encrypted versions of the file or to produce decrypted versions of the file. This is done by passing the data blocks along to the IV service 302. The IV service 302 produces the IV's and passes the IV's along with their data blocks to a cipher service. The cipher service provides the encrypted or decrypted versions of the data blocks.

According to an embodiment, the metadata is appended to a first encrypted block as a header. Alternatively, the metadata is stored separately from the encrypted blocks entirely and retrieved in response to a file identifier. The IV service 302 builds and assembles the metadata as the file being monitored is changed. The changes are communicated to the IV service 301 via the synchronization service 301.

Figure 4:
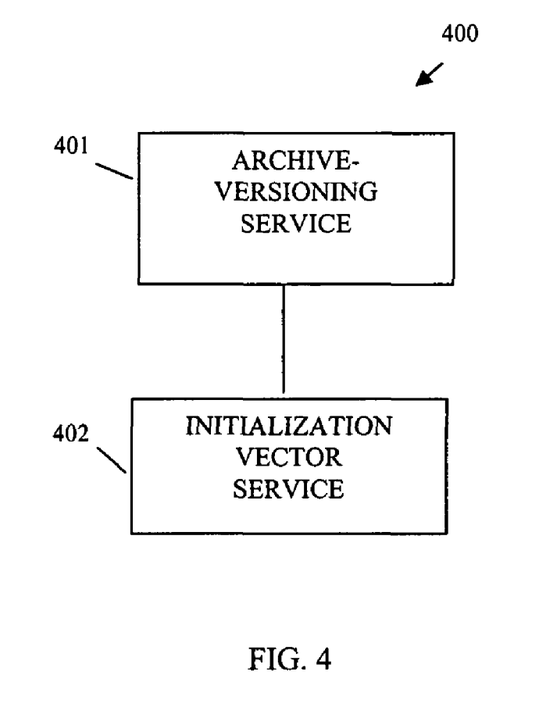
FIG. 4 is a diagram of file archive-versioning system, according to an example embodiment.

FIG. 4 is a diagram of file archive-versioning system 400, according to an example embodiment. The file archive-versioning system 400 is implemented in a machine-accessible and readable medium is accessible over a network. The network may be wired, wireless, or a combination of wired and wireless. In an embodiment, the file archive-versioning system 400 implements various aspects associated of the method 200 of the FIG. 2.

The file archive-versioning system 400 includes an archive-versioning service 401 and an IV service 402. Each of these and their interactions with one another will now be discussed in detail.

The archive-versioning service 401 is implemented in a machine-accessible and readable medium and is to process on a machine. The archive-versioning service 401 is to manage archiving and versioning of files for a volume. Each file is managed as a series of blocks or portions. When a file or the volume is versioned, the archive versioning service 401 captures the incremental changes from a source volume and implements them on the archived and versioning volume.

The IV service 402 is implemented in a machine-accessible and readable medium and is to process on the same machine or a different machine of the network. The IV service 402 produces an IV for each portion or block of a particular file when changes or versions are detected or taken on the volume. The IV is produced using a relative block identifier as a parameter along with a secure hash key parameter; the parameters passed to a vector producing service. The vector producing service when given the hash key and the relative block identifier produces a unique IV for the portion or block of the file in question. The IV when passed to a cipher service along with a block of data to which the IV relates produces an archived or de-archived version of the block of data.

According to an embodiment, the relative block identifier includes references to a configurable number of previous transactions and their relative block identifiers on the volume. So, 2 to 3 previous transactions and their transaction identifiers can be used together as the relative block identifier and the relative block identifier is passed as one of the parameters to the vector producing service.

In an embodiment, the relative block identifier also includes addition and subtraction indicators for selective block identifiers. The IV service 402 is to perform the arithmetic before passing along the relative block identifier and the hash key to the vector producing service. Examples of the relative block identifier being passed to a vector producing service was presented above with reference to the example scenarios presented with respect to the method 100 of the FIG. 1.

The relative block identifier may also include a special character to identify portions of the file that have multiple versions. This permits versions to be represented and detected in the portions or blocks associated with the file.

According to an embodiment, the archive-versioning service 401 retains data associated with deleted portions of the file from the volume. The deleted portions of the file are retained in chronological order and in a separate storage area for subsequent recovery.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory computer-readable medium and for executing on a machine, comprising:

managing a synchronized version of a file as encrypted blocks of data that when assembled and when decrypted represent a copy of that file;

maintaining metadata for the encrypted blocks, wherein the metadata includes a maximum number for the encrypted blocks and an index string identifying added and removed ones of the encrypted blocks;

using the maximum number and selective portions of the index string as input to a hash algorithm along with a hash key to produce initialization vectors for each of the encrypted blocks, the initialization vectors used to properly encrypt and decrypt data associated with each of the encrypted blocks;

detecting a new block being added within the encrypted blocks; and appending a new string to the index string of the metadata, wherein the new string includes a plus sign symbol followed by a relative position location number as to where the new block is to be positioned within the encrypted blocks.

2. A method implemented in a non-transitory computer-readable medium and for executing on a machine, comprising:

managing a synchronized version of a file as encrypted blocks of data that when assembled and when decrypted represent a copy of that file;

maintaining metadata for the encrypted blocks, wherein the metadata includes a maximum number for the encrypted blocks and an index string identifying added and removed ones of the encrypted blocks;

detecting an existing block being deleted within the encrypted blocks; and appending a new string to the index string of the metadata, wherein the new string includes a minus sign followed by a relative position location number within the encrypted blocks that identifies the existing block that was removed from the encrypted blocks; and using the maximum number and selective portions of the index string as input to a hash algorithm along with a hash key to produce initialization vectors for each of the encrypted blocks, the initialization vectors used to properly encrypt and decrypt data associated with each of the encrypted blocks.

3. A method implemented in a non-transitory computer-readable medium and for executing on a machine, comprising:

managing a synchronized version of a file as encrypted blocks of data that when assembled and when decrypted represent a copy of that file;

maintaining metadata for the encrypted blocks, wherein the metadata includes a maximum number for the encrypted blocks and an index string identifying added and removed ones of the encrypted blocks;

using the maximum number and selective portions of the index string as input to a hash algorithm along with a hash key to produce initialization vectors for each of the encrypted blocks, the initialization vectors used to properly encrypt and decrypt data associated with each of the encrypted blocks;

parsing the index string for added and removed blocks, wherein added block numbers are prefixed with a plus sign symbol and deleted block numbers are prefixed with a minus sign symbol; and iteratively reconstructing the initialization vectors during the parsing for each block number in response to the added block numbers and the deleted block numbers.

4. The method of claim 3 further comprising:

passing each initialization vector for each block number to a cipher service to decrypt data;

ordering the decrypted data; and producing the file.

5. The method of claim 1, wherein maintaining further includes identifying repeating patterns of added or deleted block numbers in the index string and compressing each repeated pattern within the index string.

6. The method of claim 1, wherein maintaining further includes acquiring the maximum number of blocks as a fixed constant or calculating the maximum number of blocks as a predefined maximum file size divided by a predefined block size.

7. A system implemented in a non-transitory computer-readable medium, comprising:

a synchronization service implemented in a non-transitory computer-readable machine and to process on a machine; and an initialization vector service implemented in a non-transitory computer-readable machine and to process on the machine or a different machine, wherein the synchronization service is to maintain an encrypted version of a file in synchronization with a decrypted version of that file via encrypted blocks, and wherein the initialization vector service is to maintain metadata for the encrypted blocks that includes a maximum number for the encrypted blocks and an index string, the index string identifying added and removed ones of the encrypted blocks, and wherein the initialization vector service is to produce an initialization vector for each encrypted block of the encrypted version of the file in response to the maximum number and selective portions of the index string, each initialization vector permits a particular block of data associated with the file to be encrypted or decrypted when supplied to a cipher service, wherein the initialization vector service is to serially append a substring onto the index string when a new block of data is detected as being inserted within the encrypted blocks, wherein the substring includes a plus sign symbol and a number representing a relative block position within the encrypted blocks to place the new block of data.

8. A system implemented in a non-transitory computer-readable medium, comprising:

a synchronization service implemented in a non-transitory computer-readable machine and to process on a machine; and an initialization vector service implemented in a non-transitory computer-readable machine and to process on the machine or a different machine, wherein the synchronization service is to maintain an encrypted version of a file in synchronization with a decrypted version of that file via encrypted blocks, and wherein the initialization vector service is to maintain metadata for the encrypted blocks that includes a maximum number for the encrypted blocks and an index string, the index string identifying added and removed ones of the encrypted blocks, and wherein the initialization vector service is to produce an initialization vector for each encrypted block of the encrypted version of the file in response to the maximum number and selective portions of the index string, each initialization vector permits a particular block of data associated with the file to be encrypted or decrypted when supplied to a cipher service, wherein the initialization vector service is to serially append a substring onto the index string when an existing block of data is detected as being deleted from the encrypted blocks, wherein the substring includes a negative sign symbol and a number representing a block position within the encrypted blocks that identifies the existing block to remove.

9. The system of claim 7, wherein the metadata is appended to a first of the encrypted blocks as a header.

10. The system of claim 7, wherein the metadata is stored separately from the encrypted blocks.

11. The system of claim 7, wherein the synchronization service is to invoke the initialization vector service to produce encrypted versions of the file or to produce a decrypted version of the file.

* * * * *